United States Patent [19]

Anderson, deceased

[11] Patent Number: 4,715,480
[45] Date of Patent: Dec. 29, 1987

[54] TANDEM WHEEL CHOCK

[75] Inventor: Milan B. Anderson, deceased, late of Chula Vista, Calif., by Thelma Anderson, administratrix

[73] Assignee: Hewitt Tubular Products, Inc., San Diego, Calif.

[21] Appl. No.: 33,044

[22] Filed: Mar. 30, 1987

Related U.S. Application Data

[63] Continuation of Ser. No. 778,228, Sep. 19, 1985, abandoned.

[51] Int. Cl.$^4$ .............................................. B60T 3/00
[52] U.S. Cl. ...................................... 188/74; 188/2 R
[58] Field of Search ...................... 188/2 R, 29, 52, 74

[56] References Cited

U.S. PATENT DOCUMENTS 2,878,899  3/1959  Kramcsak ........................... 188/2 R
3,059,728  10/1962  McKuskie ........................... 188/2 R
3,548,975  12/1970  Herndon ............................... 188/74

Primary Examiner—Duane A. Reger
Attorney, Agent, or Firm—Charmasson & Holz

[57] ABSTRACT

A device for preventing vehicles having conventional tandem wheels from moving when parked. The friction of novel dual opposing horizontal shoes pressing against the tires of the tandem wheels prevents the wheels from rotating. A cam and lever action locks the shoes in position against the tires.

6 Claims, 9 Drawing Figures

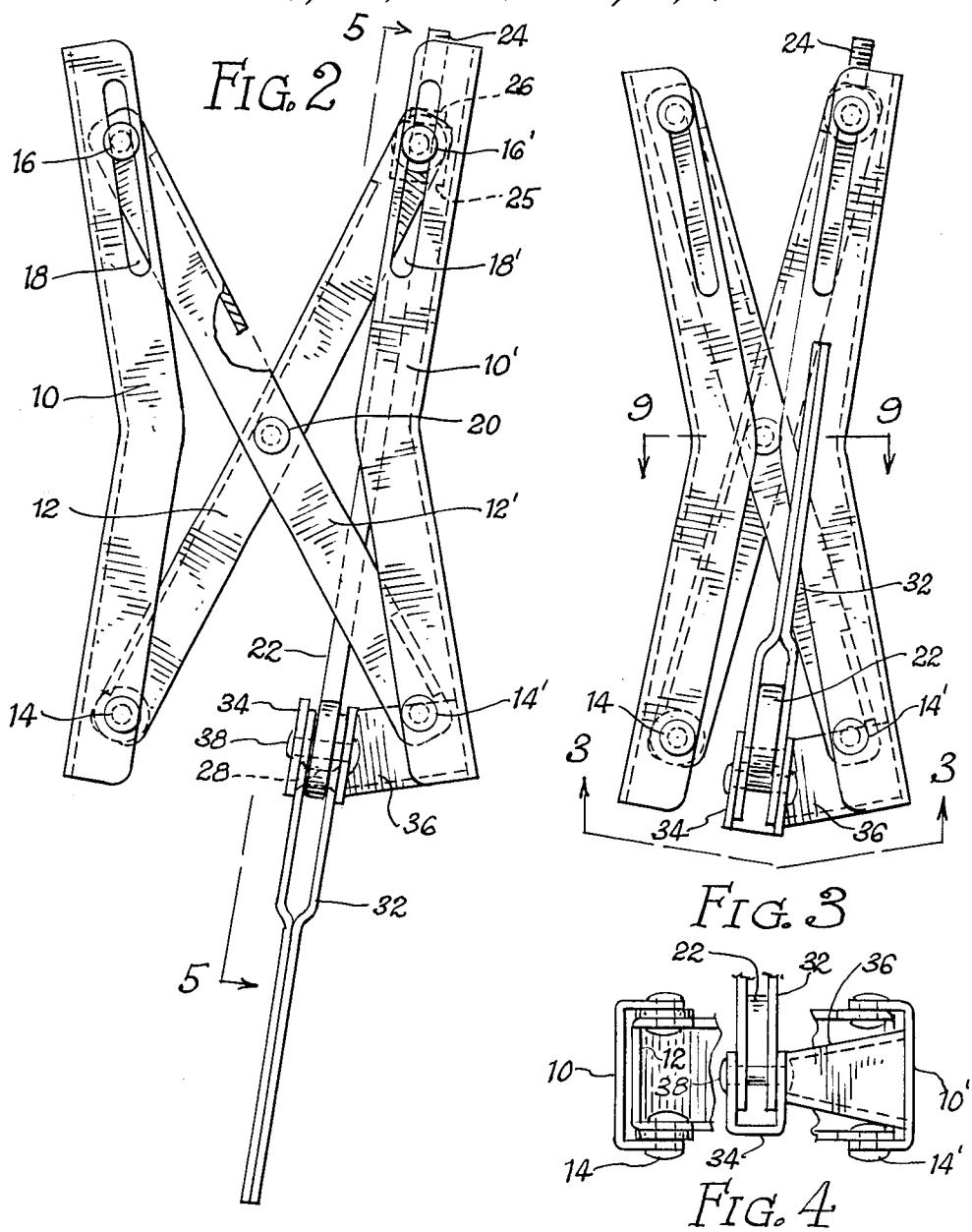

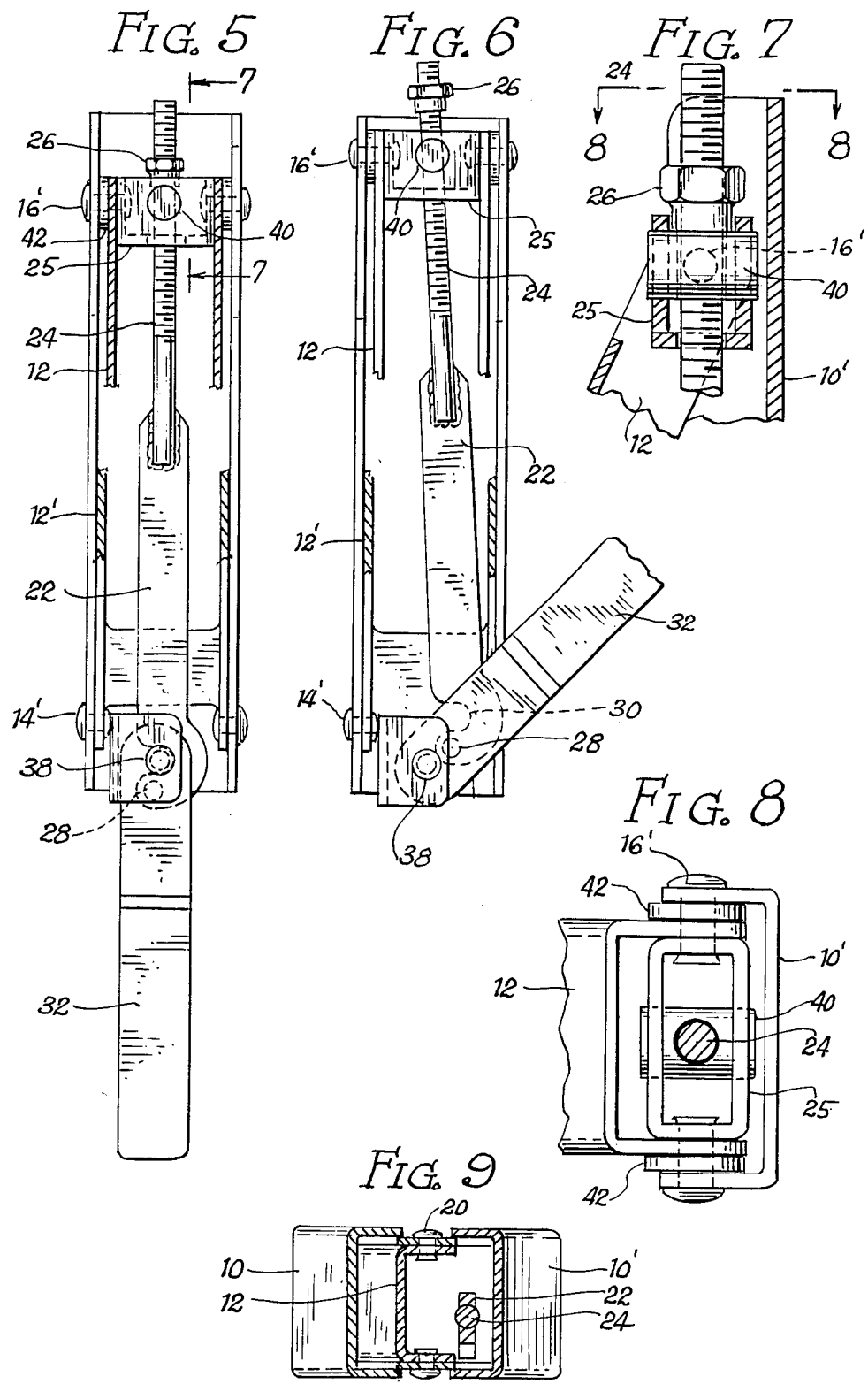

TANDEM WHEEL CHOCK

This application is a continuation of pending application Ser. No. 778,228 filed Sept. 19, 1985, now abandoned.

BACKGROUND OF INVENTION

Without stabilization the normal movement of occupants in a parked trailer or other vehicle causes undesirable movement of the vehicle itself. Also, if the vehicle is not parked on level ground it will tend to roll from its parked position unless its wheels are blocked.

Other inventions speak to the problem but with only limited success. Some can be used with only particular kinds of vehicles (such as jet planes), some mechanisms must contact the ground and therefore will not work well on all terrain. Most predecessors appear too balky and cumbersome for use by persons without manly strength and mechanical minds. Also, some cannot be easily and neatly stored when not in use.

The subject device overcomes all these objections. It is simple and easy to use. It is readily adaptable for use on various mobilehomes, house trailers and other popular rigs. The unique design allows the application of surprisingly great mechanical advantage. This feature, together with its relative light weight and mobility, permit its use by persons who may not have the strength, patience or know-how to use other devices.

SUMMARY OF INVENTION

Two shoes are operatively attached to an expanding and contracting scissor-type mechanism between them. The range of distance of expansion and contraction is pre-set to accommodate the space between the wheels in tandem on a particular vehicle. A suitable lever arm or handle provides a cam action to linkage with the shoes. Eccentric alignment of the cam assembly is such that the shoes are automatically and forcefully held against the vehicle's tires when the lever arm is fully actuated.

BRIEF DESCRIPTION OF THE DRAWINGS

In the accompanying drawings forming a part hereof:

FIG. 1 is a side elevation showing the device in use between two vehicle wheels.

FIG. 2 is a side elevation view showing the device in the expanded position.

FIG. 3 is the same as that of FIG. 2 except the device is in the closed position.

FIG. 4 is a detail of one end of the device taken along line 3—3 of FIG. 3.

FIG. 5 is a side elevation of the lever arm and linkage taken along line 5—5 of FIG. 2.

FIG. 6 is a side elevation of the lever arm and linkage taken along a corresponding line of FIG. 3.

FIG. 7 is a side elevation detail of a portion of the device taken along line 7—7 of FIG. 5.

FIG. 8 is an end view of a portion of the device taken along line 8—8 of FIG. 7.

FIG. 9 is a detail across the center of the device taken along line 9—9 of FIG. 3.

DETAILED DESCRIPTION OF DRAWINGS

Referring to the drawings wherein like numerals represent like parts throughout, the numerals 10 and 10' depict identical shoe members. They are formed as sections of standard channel bar with slight V-shape angulation at their midpoints for maximum contact with vehicular tires. The shoes are in parallel space relationship to each other with the apex of each V-shape configuration and each channel side turned inwardly and directly opposite each other. Each shoe has a pair of raceways 18 and 18' formed as slots cut through the beveled edges of the channel at one end of each shoe. At the opposite end of each shoe is a pair of orifices. The raceways and orifices serve as connection components between the shoes and their source of activation.

Attention is next invited to the lateral movement means positioned between and operatively connected to the shoe members other. Such means is essentially dual crossed brace members 12 and 12' secured at their midsections for scissor-like action when motivated. Again, the brace members are preferably formed as sections of standard channel bars but have more narrow dimensions to fit within the wider shoe members. Suitable pins or bolts 14 and 14' connect one end the brace members to the shoes and suitable bosses 16 and 16' are integral with the brace members at their opposite ends. The bosses slide in the described raceways of the shoes as illustrated. The brace members are of similar configuration except one is slightly wider than the other to operatively fit within it. Washers 42, serve as spacers between the ends of the brace members. A portion of the flat surface of the wider member is cut-away to accept the other brace member within its structure. These members are centrally joined by dual pins or bolts 20 as can best be seen in FIG. 9. Finally an actuating means is provided. It features a leverage arm in the form of a clevis handle portion 32. Its fulcrum is provided by pin 38 which is mounted across the legs of U-shaped support 34. This support is integral with a base member 36. The base member preferably has three sloping sides of pyramidal segment configuration with its large end mounted within the end of shoe member 10'. Support 34 is mounted at the smaller end of member 36. See FIG. 4 as a detail. Operation of the lever arm moves link 22 to which it is connected by pivot pin 28. Link 22 is preferably formed of strap metal. Recess 30 is provided as part of link 22 at a place which will engage pin 38 when the lever arm is fully extended. This locks the shoes in extended position. A cam or throw action results as pin 28 moves around pin 38. A linear extension of link 22 is a threaded rod 24 having adjustment nut 26 as part of the adjustment assembly to accommodate variances in space between tandem wheels on various vehicles. For a guide, a metal dowel is positioned centrally within a short sleeve section 25. The sleeve section is mounted within one end of the innermost brace member 12. Transversally through the middle of the dowel is an orifice which serves as a retainer for rod 24 mounted therein.

In use for the first time on a particular vehicle, the operator places the device between tandem wheels and manually moves the shoes horizontally apart until each contacts a tire. Adjustment nut 26 is then rotated until it touches dowel 40. Thereafter the adjustment nut need not be changed for the particular vehicle. To engage the device the lever arm need only be extended downwardly as far as it will go. It will stop in the locked position as recess 30 surrounds pin 38. To release the braking, lever arm or handle 32 need only be manually raised. This will cause the shoes to move inwardly and withdraw them from snug contact with the tires.

Having described the invention, what is claimed is:

1. A chock for preventing rotation of two tandem wheels placed one behind the other on one side of a vehicle parked above a nearly horizontal surface comprising:
   a pair of generally V-shaped shoe members, each shoe member comprising two attached planar surfaces shaped and positioned so that both planar surfaces of each shoe member contact only one of said wheels, but each planar surface contacts a separate location on the circumference of each of said wheels when said shoe members are placed oppositely in between said two tandem wheels with one planar surface of each shoe member placed below the axis of rotation of said wheels but above said nearly horizontal surface and the other planar surface of each shoe member above the axis of rotation of said wheels;
   a pair of cross brace members pivotally attached to each other at approximately midpoints, pivotally attached at one end of each cross brace member to opposite planar surfaces located below the axis of rotation of said wheels, and slidably attached at the other end of each cross brace member to opposite planar surfaces located above the axis of rotation of said wheels, said cross brace members providing a structural support means of contra-acting and expanding shoe members towards and away from said tandem wheels which allows each shoe to contact and retract from each wheel and be removed from between said wheels when retracted;
   an actuation link bar pivotally attached near one end to one of the cross brace member ends which is slidably attached to a planar surface; and
   a lever arm pivotally attached near one end to said shoe member having said actuation link bar attached, said lever arm also pivotally attached inboard of said shoe member attachment to said actuation link bar in a manner which causes said pair of cross brace members to move upon motion of said lever arm.

2. The wheel chock according to claim 1, wherein said pivotal attachment between actuation link bar and brace member comprises:
   a threaded portion of said actuation link bar near said pivotal attachment to said brace member;
   a boss member attached to said brace member having a passage containing said threaded portion of said actuation link bar; and
   a threaded retainer attached to said threaded portion of said actuation link bar wherein adjustment of said retainer alters the position of said cross brace members to pre-set the space between said shoes to conform to the space between said wheels of said vehicle.

3. The wheel chock according to claim 1 which also comprises a notch in said actuation link bar, inboard from said pivotal attachment to said lever arm, said notch's distance to said lever arm pivotal attachment being nearly equal to the distance on said lever arm between said actuation link bar pivot and said shoe member pivot, said notch being sized to retain said shoe member pivot when said lever arm is fully rotated in such a manner to retain said shoes in their fully expanded position.

4. In combination with a pair of tandem wheels placed one behind the other on one side of a vehicle, a wheel chock assembly which comprises:
   expandable means horizontally bridging the shortest distance between said wheels, having:
      a first shoe applied against one wheel;
      a second shoe applied against the other wheel;
      said shoes being generally bar-shaped and in a vertical, parallel, spaced-apart relationship, each shoe having a fixed pivot and a vertical slot distance from said pivot;
   horizontally contracting and expanding means including:
      a pair of cross-braces pivotally connected at midpoint in a scissor-like configuration;
      a fixed end on each of said braces being pivotally connected to the fixed pivot of one shoe, and a sliding other end of said brace being slidably engaged into the slot of the other shoe; and
      means for adjusting the position of one of said sliding ends within its engaged slot.

5. The combination claimed in claim 4, wherein said means for adjusting comprises a lever mechanism operatively connected between one of said shoes and the sliding end of the cross-brace engaged within the slot of said shoe.

6. The combination claimed in claim 5, wherein said lever mechanism comprises an adjustment nut-and-threaded-rod assembly for presetting the distance between the shoes over a wide range, and a lever acting upon said nut-and-threaded-rod assembly to further increase said distance over a fraction of said range.

* * * * *